United States Patent
Watanabe et al.

[11] Patent Number: 5,692,783
[45] Date of Patent: Dec. 2, 1997

[54] HOSE CONNECTOR

[75] Inventors: Norio Watanabe, Inazawa; Kenichi Mitsui, Ichinomiya, both of Japan

[73] Assignee: Toyoda Gosei Co., Ltd., Aichi, Japan

[21] Appl. No.: 651,870

[22] Filed: May 21, 1996

[30]  Foreign Application Priority Data

May 23, 1995   [JP]   Japan ................. 7-123462

[51] Int. Cl.$^6$ ................ F16L 5/00; F16L 37/12
[52] U.S. Cl. ............... 285/61; 285/26; 285/137.1; 285/162; 285/319
[58] Field of Search .............. 285/26, 29, 61, 285/62, 137.1, 158, 162, 194, 205, 319, 921

[56]          References Cited

U.S. PATENT DOCUMENTS

| | | | |
|---|---|---|---|
| 3,366,405 | 1/1968 | Sevrence | 285/162 X |
| 4,462,620 | 7/1984 | Bambenek et al. | 285/162 |
| 4,468,535 | 8/1984 | Law | 285/162 X |
| 4,941,689 | 7/1990 | Sjoberg | 285/319 X |
| 5,022,461 | 6/1991 | Potier et al. | 285/137.1 X |
| 5,114,250 | 5/1992 | Usui | 285/319 |
| 5,228,724 | 7/1993 | Godeau | 285/319 X |

FOREIGN PATENT DOCUMENTS 2648384   6/1977   Germany ................. 285/319

Primary Examiner—John A. Ricci
Attorney, Agent, or Firm—Cushman Darby & Cushman, IP Group of Pillsbury Madison & Sutro LLP

[57]          ABSTRACT

A hose connector connects a hose with a pipe which projects through a mounting member, and includes a connector body, an intermediate member and a grommet. The connector body includes a hose connector member, and a pipe connector member. The intermediate member is detachably engaged with the connector body, and includes a second engager and an engager claw. The intermediate member can be assembled with the connector body by simply engaging the second engager with the first engager of the connector body, and can be assembled with the mounting member by simply engaging the engager claw with a mounting hole of the mounting member. The grommet is held on the intermediate member so as to seal a periphery of the mounting hole of the mounting member. The hose connector enables not only to connect a hose with a pipe by snap action, but also to project a pipe through the mounting member by a reduced length.

4 Claims, 12 Drawing Sheets

HOSE CONNECTOR

BACKGROUND OF THE INVENTION

1. Field of the Invention

The present invention relates to a hose connector for connecting a hose with a pipe. More particularly, it relates to a hose connector which can connect a hose with a pipe penetrating through a panel, such as a dashboard panel, so as to give the pipe a sealing property with respect to the panel.

2. Description of Related Art

In automobiles, an engine coolant circulates from a radiator to an engine, and carries out heat-exchange at a heat-exchange unit which is disposed on a passenger room side. Thus, automobiles utilize the engine coolant to cool and heat a passenger room. Accordingly, it is necessary to dispose a coolant passage that will penetrate through a dashboard panel which separates an engine room or compartment from the passenger compartment. As a result, on the engine-compartment side, a heater hose should be connected with the pipe, which extends from the heat exchange-unit and projects through the dashboard panel.

As illustrated in FIG. 13, a heater hose and a pipe have been connected in the following manner; a metallic pipe 100, extending from a heat-exchange unit disposed in the passenger compartment, is protruded through a panel hole 201, formed in a dashboard panel 200, into the engine compartment. Then, the metallic pipe 100 is inserted into a heater hose 300, and is fastened thereto by a clip 301 on the engine side. Note that a rubber grommet 101 is disposed between the panel hole 201 and the metallic pipe 100 in order to inhibit the external air and noises from intruding from the engine area into a passenger compartment.

In the above-described conventional connection between the heater hose 300 and the metallic pipe 100, the heater hose 300 is fastened to the metallic pipe 100 in the following manner; the rubber grommet 101 is first put on the panel hole 201. The clip 301 is first enlarged diametrically, and then disposed around the leading end of the heater hose 300. Then, the metallic pipe 100, protruding through the panel hole 201 into the engine compartment, is fitted into the heater hose 300 with the diametrically-enlarged clip 301 still enlarged. Finally, the clip 301 is diminished diametrically to fasten the heater hose 300 to the metallic pipe 100 after the metallic pipe 100 is inserted into the heater hose 300 by a predetermined length.

When replacing the heater hose 300, or when repairing the heat-exchange unit, the clip 301 is enlarged diametrically by a jig. Thereafter, soapy water is soaked between the heater hose 300 and the metallic pipe 100 in order to remove the heater hose 300 from the metallic pipe 100.

Recently, however, the density of on-board component parts has risen in engine compartments. Thus, it is difficult to carry out operations there. As a result, it is necessary to further simplify the operations, such as putting the rubber grommet 101 on the panel hole 201, and the installations and detachments of the clip 301 and the heater hose 300.

Moreover, when the metallic pipe 100 is fastened to the heater hose 300 by the clip 301, the metallic pipe 100 should protrude through the panel hole 201 by a length of a width of the clip 301 or more; thereby further adversely affecting the operational space. For instance, when a heater hose 300 having an outside diameter of 24 mm is employed, and even when it is a bent hose, it requires a space of from about 70 to 120 mm in length, space which allows the metallic pipe 100 to appropriately project from the dashboard panel 200.

Consequently, a connector is devised in order to install and detach the heater hose 300 to and from the metallic pipe 100 by snap action. For example, the heater hose 300 has been connected with such a connector in advance, and the connector is installed and detached to and from the metallic pipe 100. Even when such a connector is employed, however, it is necessary to prepare a jig for disconnecting the connector from the heater hose 300, and to provide an extra space for operating such a jig. As a result, similarly to the fastening by the clip 301, such a connector adversely affects the operational space. In addition, the provision of such a connector increases the number of component parts adversely.

SUMMARY OF THE INVENTION

The present invention has been developed in view of the aforementioned circumstances. It is therefore an object of the present invention to provide a hose connector which enables the installing and detaching a heater hose to and from a panel (e.g., a dashboard panel) by snap action, and which enables a pipe to protrude through the panel by a reduced length.

An embodiment of a hose connector according to the present invention can carry out the object, and comprises:

- a connector body including a hose connector member connected with a hose, a pipe connector member connected with a pipe and communicating with the hose connector member, the pipe extending through a mounting hole of a mounting member and fitted into the pipe connector member, and a first engager disposed adjacent to the pipe connector member;

- an intermediate member detachably engaged with the connector body, and including a central hole, a flange extending around the central hole and having opposite sides, a second engager formed on one of the opposite sides of the flange and detachably engaged with the first engager, and an engager claw formed on another one of the opposite sides of the flange, fitted into the mounting hole to engage with the mounting member; and

- a grommet held on another one of the opposite sides of the flange of the intermediate member, and interposed between the mounting member and the flange to seal a periphery of the mounting hole.

When the pipe, extending from the mounting hole of the mounting member, is inserted into the pipe connector member by using the embodiment of the present hose connector, the hose is first connected with the hose connector member of the connector body. The first engager of the connector body is then engaged with the second engager of the intermediate member to assemble the connector body and the intermediate member. Note that the grommet is held on another one of the opposite sides of the flange of the intermediate member.

Further, the pipe is inserted into the pipe connector member of the connector body through the central hole of the flange in the intermediate member. At the same time, the engager claw of the intermediate member is fitted into the mounting hole of the mounting member, and is engaged with the mounting hole on the opposite side of the mounting hole to fix the intermediate member on the mounting member. At this moment, the grommet is interposed between the flange and the mounting member to seal a periphery of the mounting hole.

Furthermore, the intermediate member and the connector body are fixed to each other by the engagement of the first engager and the second engager. Accordingly, the mounting member and the connector body are fixed by the intermediate member. Thus, the pipe and the hose can be connected to each other by snap action while the mounting hole is kept to be sealed by the grommet.

In the assembly state established by the embodiment of the present hose connector, no clip is employed. Accordingly, the pipe, extending from the mounting member, can protrude through the mounting hole thereof by a reduced length. Thus, the hose connector member of the connector body can be formed as a perpendicularly-bent configuration so as to reduce the distance between the mounting member and the hose. As a result, it is possible to save operational space in an automobile engine compartment.

When disassembling the embodiment of the present hose connector for maintenance, or the like, the engagement of the first engager with the second engager is disengaged to separate the connector body from the intermediate member. Simultaneously with the disengagement, the pipe is pulled off the pipe connector member. Thus, the hose can be separated from the pipe with ease.

Even in the disassembled state, the engager claw of the intermediate member remains engaged with the mounting member, and accordingly the grommet and the intermediate member remain mounted on the mounting member. As a result, when re-assembling the connector body connected with the hose with the mounting member, the pipe is inserted into the pipe connector member of the connector body, and at the same time the first engager of the connector body is engaged with the second engager of the intermediate member. Thus, the hose and the pipe can be re-connected to each other with ease.

As having been described so far, in accordance with the embodiment of the present hose connector, it is possible to connect the hose with the pipe and the mounting member, and to disconnect the hose from the pipe extremely easily. Hence, the hose can be installed to and detached from the pipe so easily that the operability of the assembly and disassembly can be improved.

In addition, in accordance with the embodiment of the present hose connector, the hose can be protruded from a surface of the mounting member by a reduced length. Therefore, an operational space can be saved in an automobile engine room.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and are not intended to limit the scope of the appended claims.

The preferred embodiments of the present hose connector are for connecting a pipe and a heater hose. The pipe extends from a heat-exchange unit which is disposed on a passenger-compartment side of an automobile, and projects into an engine room of the automobile through a dashboard panel.

First Preferred Embodiment

Figure 1:
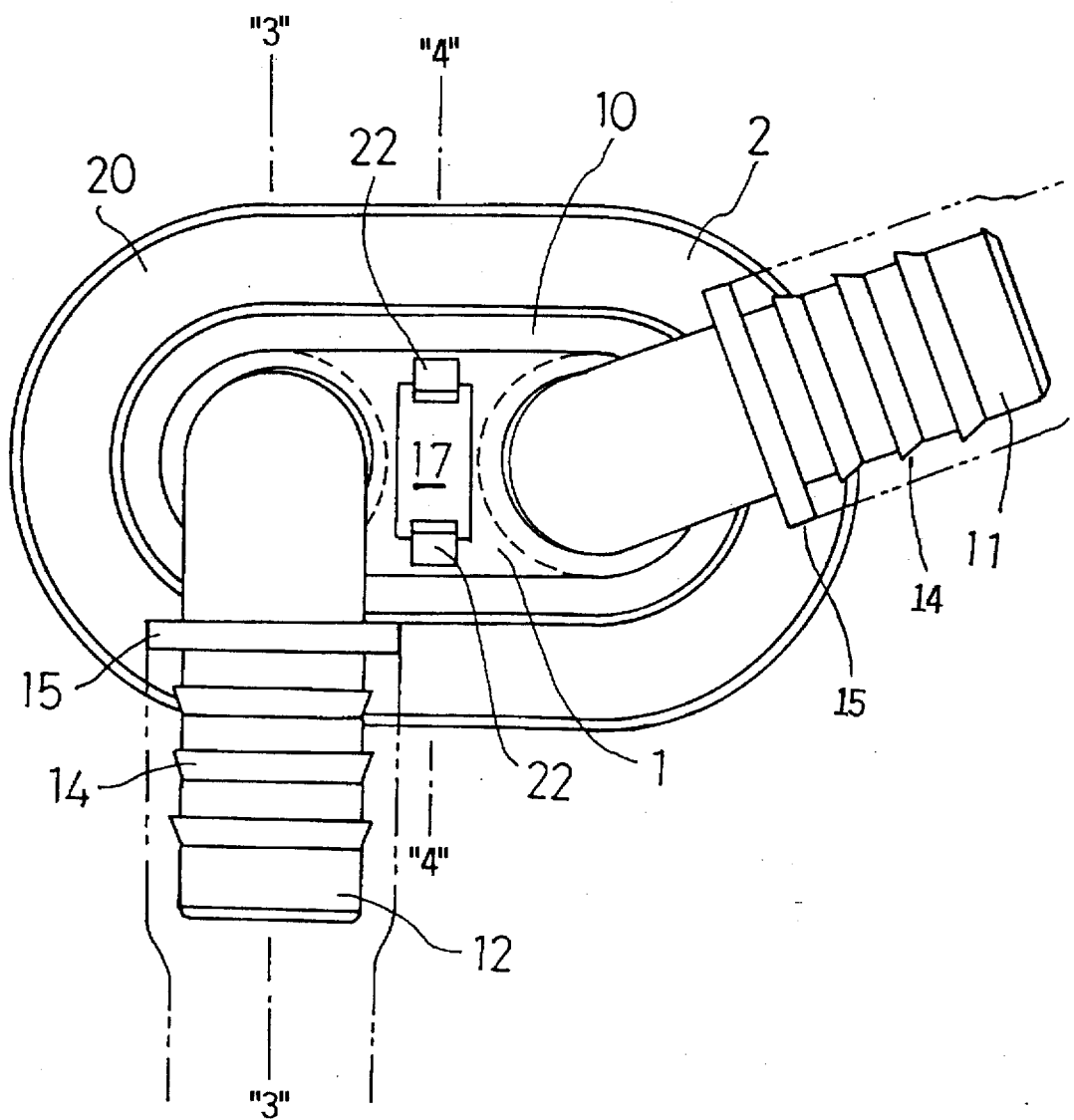
FIG. 1 is a front view of a First Preferred Embodiment of a hose connector according to the present invention.
Figure 2:
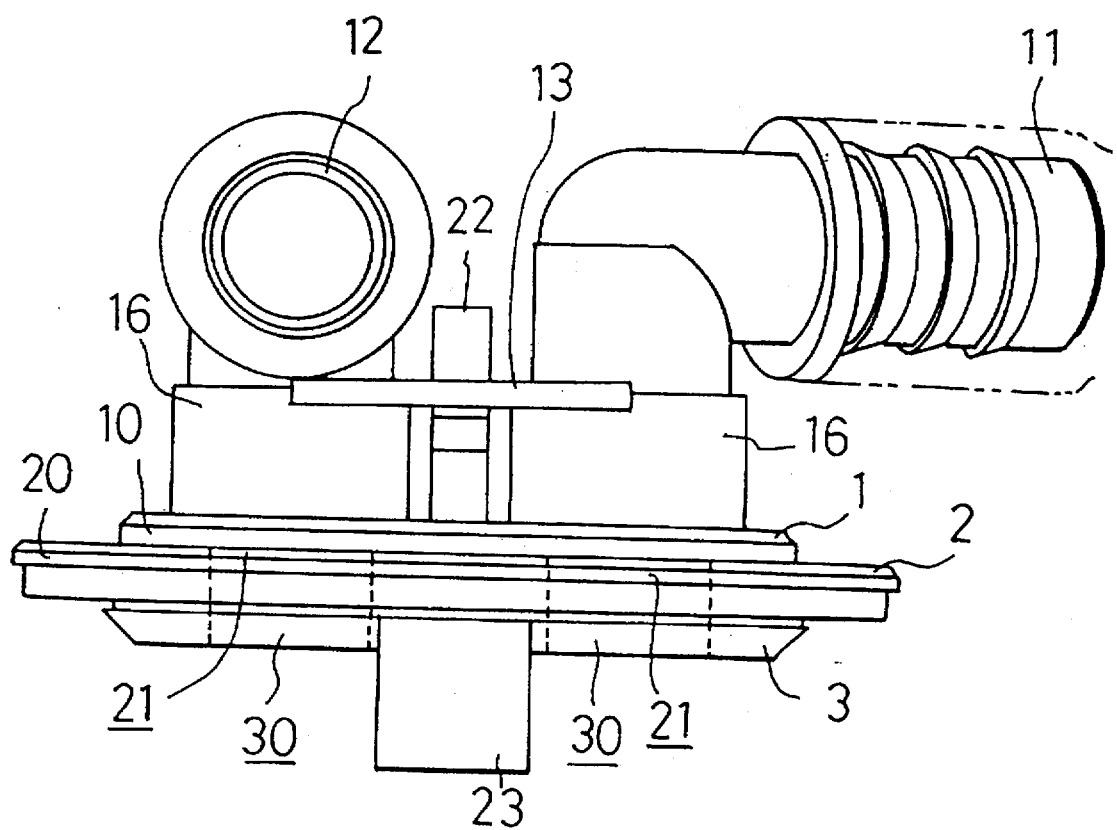
FIG. 2 is a plan view of the First Preferred Embodiment of the present hose connector.
Figure 3:
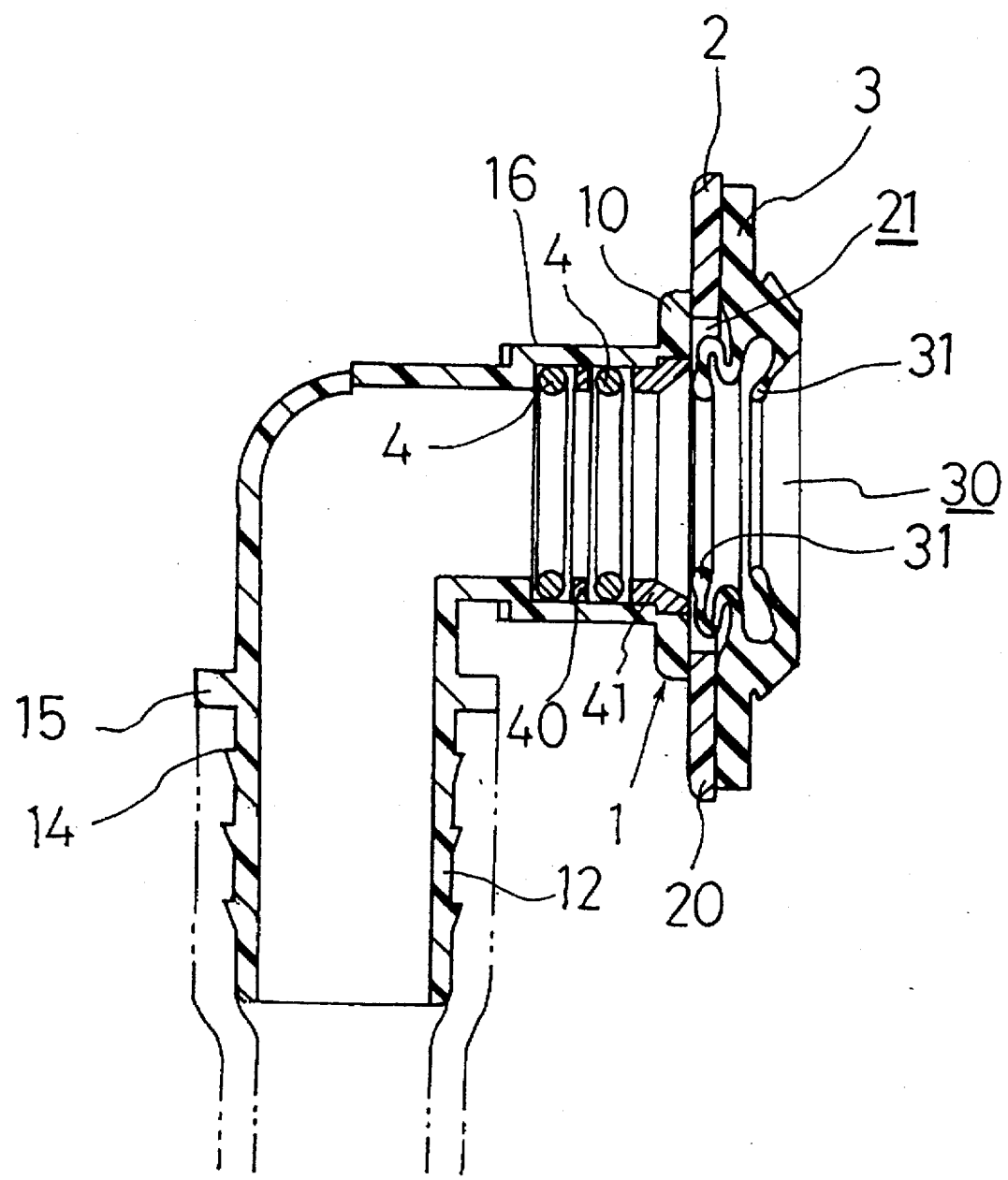
FIG. 3 is a cross-sectional view of the First Preferred Embodiment of the present hose connector taken along line "3"—"3" of FIG. 1.
Figure 4:
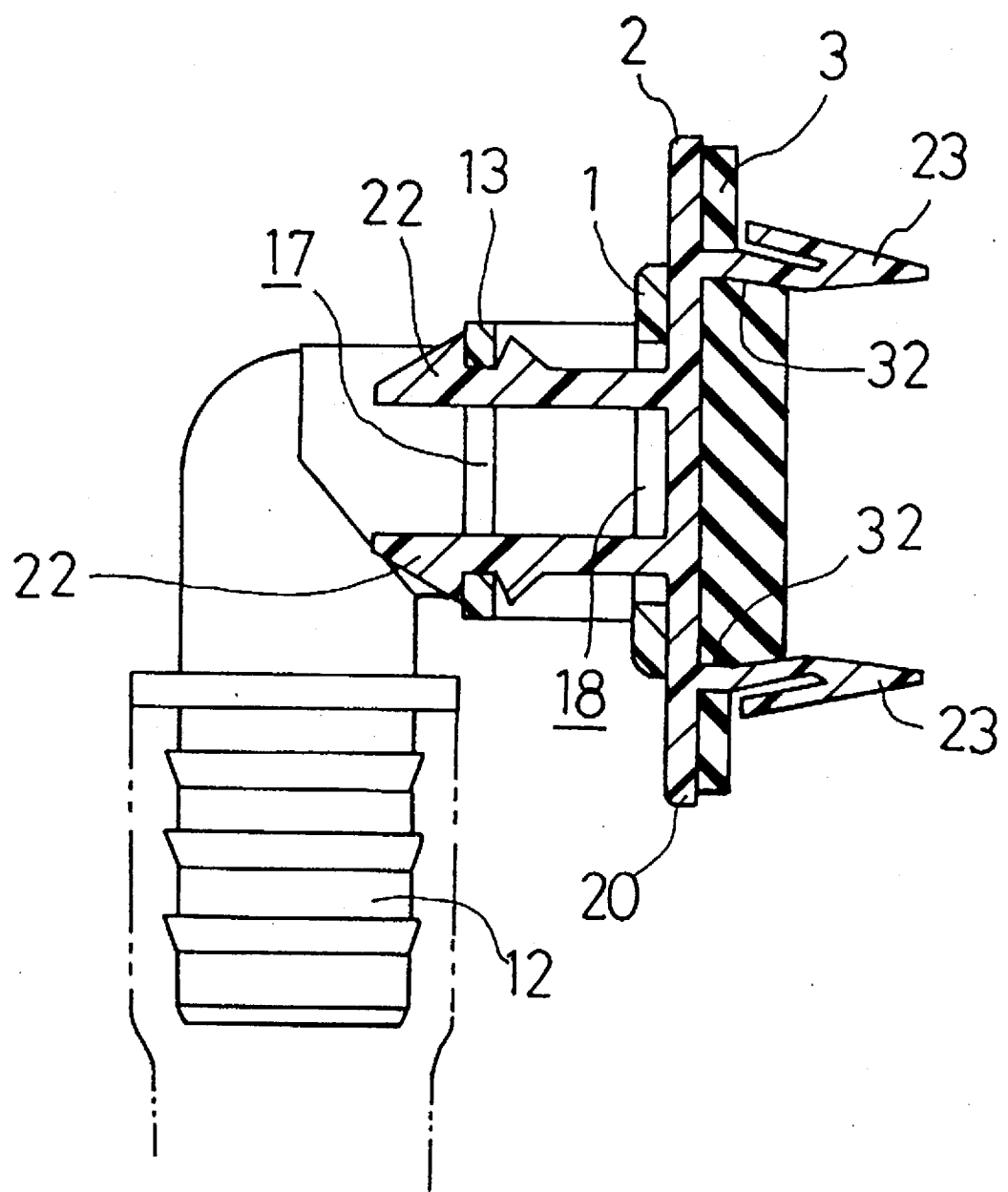
FIG. 4 is a cross-sectional view of the First Preferred Embodiment of the present hose connector taken along line "4"—"4" of FIG. 1.

FIGS. 1 through 4 illustrate a First Preferred Embodiment of the present hose connector. The First Preferred Embodiment includes a connector body 1, an intermediate member 2, and a grommet 3. As illustrated in FIG. 1, the connector body 1 has a pair of tube-shaped hose connector members 11, 12 with which an inlet hose and an outlet hose are connected respectively. As shown in FIGS. 3 and 4, the grommet 3 is made of rubber.

The connector body 1 is made of resin. As illustrated in FIG. 1, the connector body 1 includes a plate-shaped first flange member 10, the inlet hose connector member 11, the outlet hose connector member 12, and a fastening plate 13 (best shown in FIG. 2). As illustrated in FIG. 2, the inlet hose connector member 11 projects from one of the opposite surfaces of the first flange member 10, and bends substantially perpendicularly. Likewise, the outlet hose connector member 12 projects from one of the opposite surfaces of the first flange member 10, and bends substantially perpendicularly. Note that the inlet hose connector member 11 and outlet hose connector member 12 bend perpendicularly in different directions. The fastening plate 13 is disposed away from the first flange member 10 by a predetermined distance, and fastens the inlet hose connector member 11 and the outlet hose connector member 12.

The inlet hose connector member 11 and the outlet hose connector member 12 are formed with a tubular shape, respectively. On their leading-end outer peripheral surfaces, there are formed a plurality of projections 14 and a stopper 15. The projections 14 inhibit the inlet and outlet hoses from coming off. The projections 14 have a wedge-shaped cross-section. The stopper 15 controls how long the inlet hose connector member 11 and the outlet connector member 12 are inserted into the inlet and outlet hoses.

Figure 5:
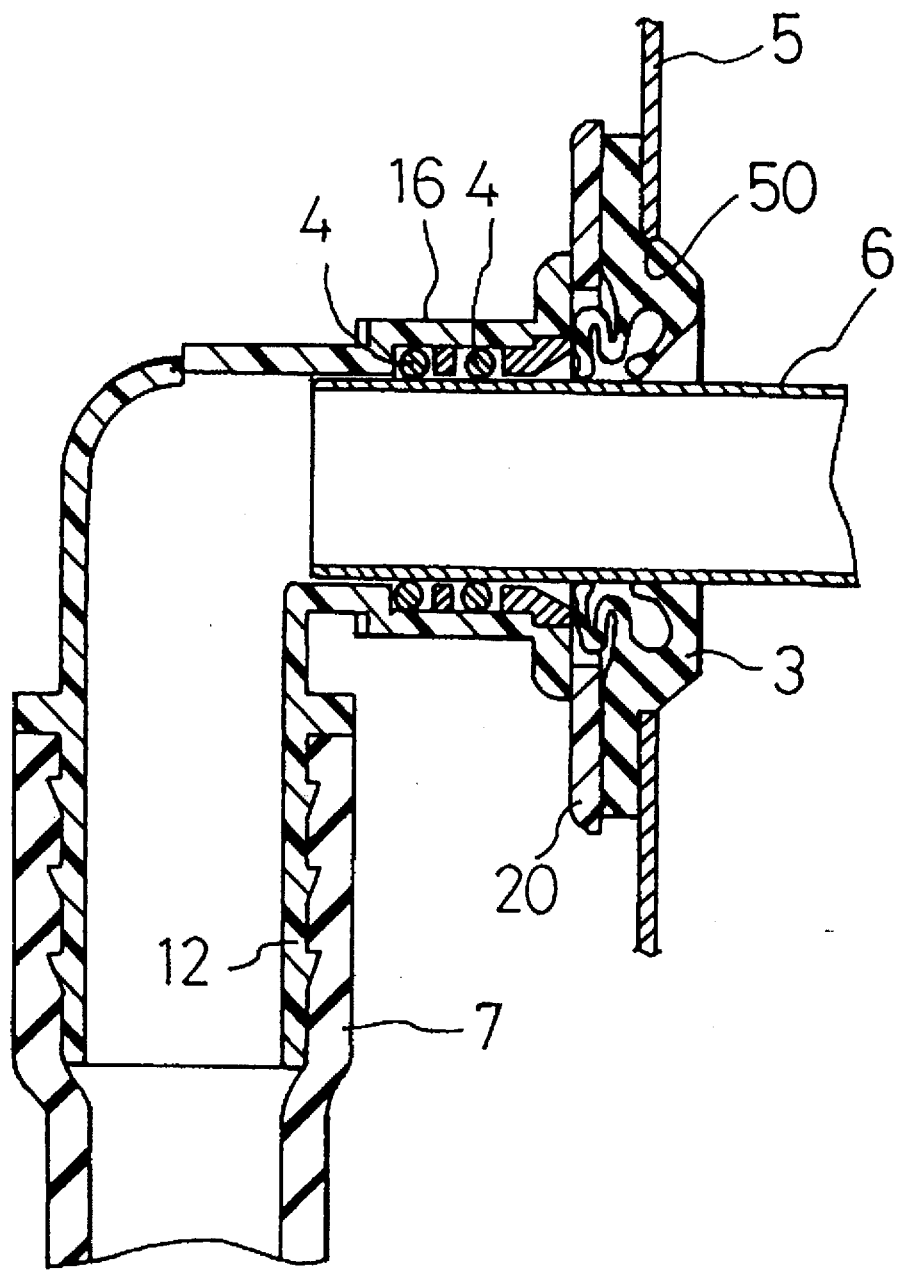
FIG. 5 is a cross-sectional view of the First Preferred Embodiment mounted on a dashboard panel.

As illustrated in FIG. 2, the inlet hose connector member 11 and the outlet connector member 12 are provided with a pipe connector member 16 on their portions adjacent to the first flange member 10. As illustrated in FIGS. 3 and 5, in the pipe connector member 16, there are disposed two O-rings 4, 4. A ring-shaped stopper 40 separates the two O-rings 4, 4 from each other. Another ring-shaped stopper 41 inhibits the two O-rings 4, 4 from moving in the axial direction. Note that, in the First Preferred Embodiment, while the pipe connector member 16 is provided with two O-rings 4, 4, it can be provided with a single O-ring, or three or more O-rings.

Figure 6:
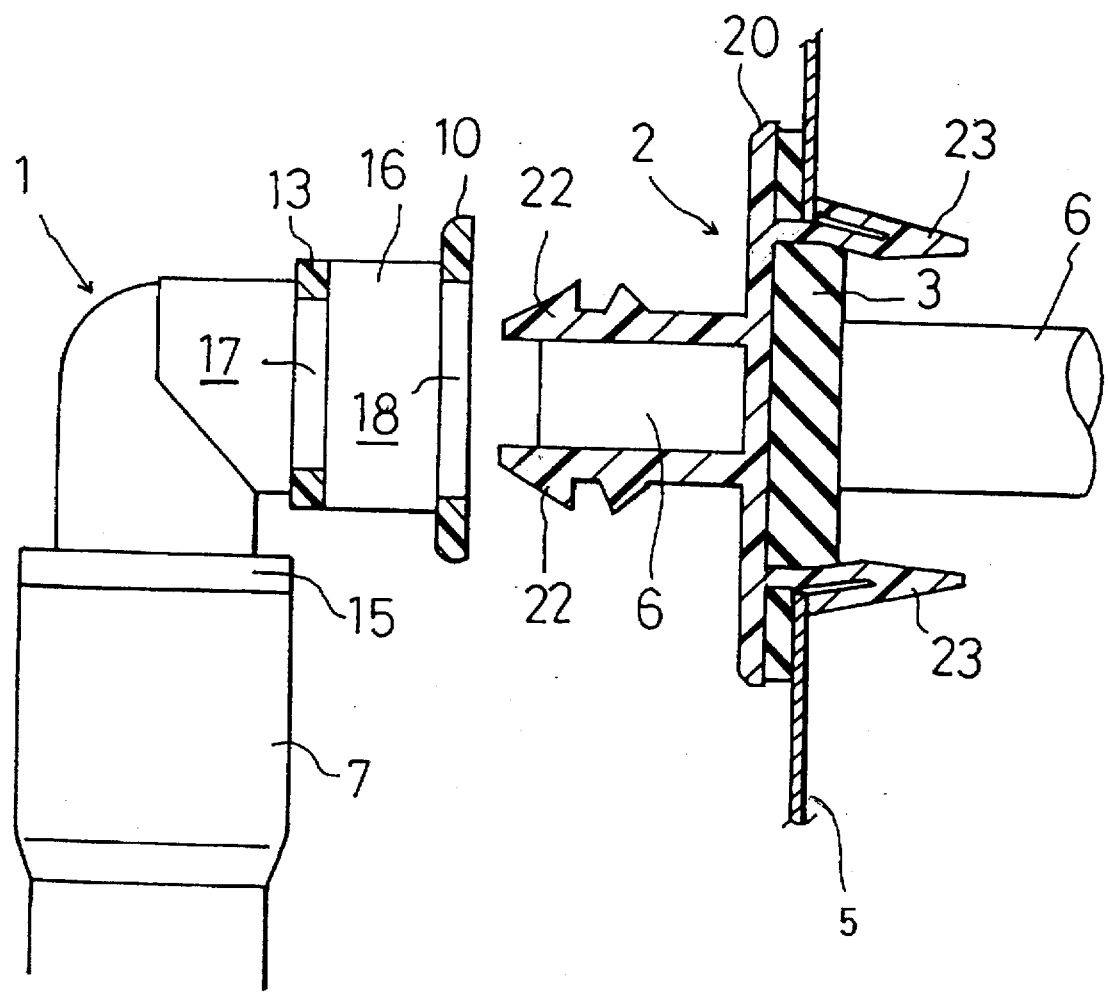
FIG. 6 is a cross-sectional view of the First Preferred Embodiment mounted on the dashboard panel but with a connector body disconnected.

As can be seen from FIG. 1, the fastening plate 13 is provided with a first slot 17. The first slot 17 is placed between the pair of pipe connector members 16, 16. The first slot 17 penetrates through the fastening plate 13, and extends parallel to the axial direction of the pipe connector members 16, 16. As shown in FIGS. 4 and 6, the first flange member 10 is further provided with a second slot 18. The second slot 18 extends parallel to the first slot 17, and has a length longer than that of the first slot 17. The axial directions of the first slot 17 and the second slot 18 coincide with each other.

As illustrated in FIGS. 4 and 6, the resin-made intermediate member 2 includes a second flange member 20, a pair of first engager claws 22, 22, and a pair of second engager claws 23, 23. As best shown in FIG. 2, the second flange member 20 has a pair of through holes 21, 21. The second flange member 20 is larger than the first flange member 10 of-the connector body 1. As described later, a pair of pipes 6, 6 are fitted into the through holes 21, 21. The first engager claws 22, 22 are disposed between the through holes 21, 21, and project from the second flange member 20 in one direction. The second engager claws 23, 23 are disposed between the through holes 21, 21, and project from the second flange member 20 in another direction which is opposite to the projecting direction of the first engager claws 22, 22.

The first engager claws 22, 22 can deform resiliently so that they can approach each other and separate from each other by a relatively small force (e.g., by pinching with fingers). As can be appreciated from FIGS. 4 and 6, the first engager claws 22, 22 can freely pass through the second slot 18 of the first flange member 10 of the connector body 1, but interfere with the first slot 17 of the fastening plate 13 so that they resiliently deform and approach to each other. When the wedge-shaped leading end of the first engager claws 22, 22 comes out of the first slot 17, the first engager claws 22, 22 are restores to their original shape to engage with the first slot 17. Note that, when the first engager claws 22, 22 engage with the first slot 17, the first flange member 10 and the second flange member 20 are brought into contact with each other, and are inhibited from moving. For example, the first slot 17 constitutes the first engager in the present hose connector, and the first engager claws 22, 22 constitute the second engager therein.

In the First Preferred Embodiment of the present hose connector, the intermediate member 2 is provided with the first engager claws 22, 22, and the connector body 1 is provided with the first slot 17. Note that, however, the present hose connector is not limited to this arrangement.

For instance, it is possible to provide an engager claw projecting from the connector body 1 for the connector body 1, and to provide a slot engaging with the engager claw for the intermediate member 2.

Likewise, the second engager claws 23, 23 can deform resiliently so that they can approach each other and separate from each other. The second engager claws 23, 23 can pass through an installation hole 50 of a dashboard panel 50 (described later) by deforming themselves so as to approach to each other. When the wedge-shaped leading end of the second engager claws 23, 23 comes out of the installation hole 50, the second engager claws 23, 23 are restored to their original shape and engage dashboard panel 50. For example, the second engager claws 23, 23 constitute the engager claw in the present hose connector.

As illustrated in FIG. 2, the grommet 3 is formed virtually as large as the second flange member 20 of the intermediate member 2. The grommet 3 includes a pair of through holes 30, 30 which communicate with the through holes 21, 21 of the intermediate member 2. As illustrated in FIGS. 3 and 5, the grommet 3 is provided with a plurality of lips 31 on the inner peripheral surface of the through holes 30, 30. The lips 31, 31 are formed so that they can resiliently contact pipes 6, 6 (later described), and that they can cover and seal the installation hole 50. In addition, as illustrated in FIG. 4, the grommet 3 is provided with a pair of slits 32, 32 between the through holes 31, 31. The second engager claws 23, 23 can pass and project through the slits 32, 32.

With reference to FIGS. 4 through 6, how the thus constructed First Preferred Embodiment of the present hose connector is used to connect the pipes 6, 6 with a heater hose 7 will be hereinafter described. As mentioned earlier, the pipes 6, 6 project from the dashboard panel 5.

As illustrated in FIG. 4, the inlet hose connector member 11 and the outlet hose connector member 12 of the connector body 1 are respectively inserted into an inlet hose and an outlet hose which constitutes the heater hose 7. When the inlet hose connector member 11 and the outlet hose connector member 12 are, respectively, inserted into the inlet hose and the outlet hose, the leading end of the inlet and outlet hoses, constituting the heater hose 7, are forcibly expanded diametrically and fitted around the inlet and outlet hose connector members 12, 13, respectively. Thus, as illustrated in FIG. 5, the inlet and outlet hoses are fastened to the inlet and outlet hose connector members 12, 13 so firmly that few fastening clips are required.

Thereafter, the first engager claws 22, 22 of the intermediate member 2 are fitted first into the second slot 18 and then into the first slot 17 of the connector body 1. Thus, as can be appreciated from FIG. 4, the first engager claws 22, 22 engage with the first slot 17 to fasten the intermediate member 2 with the connector body 1. Note that, at this moment, the second engager claws 23, 23 are fitted into the slits 32, 32 of the grommet 3 to hold the grommet 3 on the opposite side of the intermediate member 2.

When the connector body 1, the intermediate member 2 and the grommet 3 are thus assembled, a worker holds the connector body 1 and presses it against the pair of pipes 6, 6. Thus, as illustrated in FIG. 5, the pair of pipes 6, 6 are fitted into the pair of pipe connector members 16, 16, respectively. At the same time, the second engager claws 23, 23 of the intermediate member 2 are press-fitted into the installation hole 50 of the dashboard panel 5 from which the pipes 6, 6 project. Thus, as can be appreciated from FIG. 6, the leading end of the second engager claws 23, 23 projects from the opposite side of the dashboard panel 5.

When the leading end of the second engager claws 23, 23 projects from the opposite side of the dashboard panel 5, the second engager claws 23, 23 are restored to their original shape and engage the dashboard panel 5 on the opposite side of the dashboard panel 5. Thus, the intermediate member 2 is fastened to the dashboard panel 5. Accordingly, the connector body 1 is fastened to the dashboard panel 5 by way of the intermediate member 2, because the intermediate member 2 is fastened to the connector body 1. At this moment, as illustrated in FIG. 5, the grommet 3 is compressed between the dashboard panel 2 and the second flange member 20 of the intermediate member 2, and is resiliently brought into contact with the pipes 6, 6 at the lips 31, 31. Thus, the grommet 3 seals the installation hole 50 of the dashboard panel 5.

In addition, the O-rings 4, 4 are resiliently brought into contact with the outer peripheral surface of the leading end of the pipes 6, 6. Thus, the O-rings 4, 4 seal between the pipes 6, 6 and the connector body 1.

As described so far, it is possible not only to fasten the First Preferred Embodiment of the present hose connector to the dashboard panel 5 by snap action, but also to seal between the First Preferred Embodiment of the present hose connector and the dashboard panel 5 highly closely. The First Preferred Embodiment thus connects the heater hose 7, including the inlet and outlet hoses, with the pipes 6, 6. Further, the First Preferred Embodiment enables the pipes 6, 6 to project from the dashboard panel 5 by a reduced length. For example, when the heater hose 7 is employed whose inlet and outlet hoses have an outside diameter of 24 mm, the First Preferred Embodiment enables the pipes 6, 6 to project from the dashboard panel 5 only by 50 mm or less. Thus, the First Preferred Embodiment is an advantageous construction for saving operational space in an automobile engine compartment.

When disassembling the heater hose 7, including the inlet and outlet hoses, from the pipes 6, 6 for maintenance, the pair of first engager claws 22, 22 are pinched manually with fingers, or the like. The first engager claws 22, 22 approach to each other, and accordingly disengage from the first slot 17 of the connector body 1. When the first engager claws 22, 22 are disengaged from the first slot 17, the connector body 1 is pulled to separate it from the intermediate member 2 as illustrated in FIG. 6. Thus, the connector body 1 is disconnected from the pipes 6, 6. As a result, the heater hose 7, including the inlet and outlet hoses, can be separated from the pipes 6, 6 with ease.

Even when the heater hose 7, including the inlet and outlet hoses, is separated from the pipes 6, 6, the intermediate member 2 and the grommet 3 remain tightly fastened and sealed to the dashboard panel 5. When reassembling the connector body 1 with the intermediate member 2 and the grommet 3, the connector body 1 is simply pressed onto the pair of first engager claws 22, 22 as well as onto the pipes 6, 6 which project through the dashboard panel 5. Thus, the first engager claws 22, 22 are pressed by the peripheral portion of the first slot 17 and approach to each other. When the leading end of the first engager claws 22, 22 goes beyond the first slot 17, the first engager claws 22, 22 engage the first slot 17 to fasten the hose connector body 1 to the intermediate member 2 and the grommet 3. Note that, at this moment, the pipes 6, 6 are fitted into the pipe connector members 16, 16, and are tightly sealed thereto by the O-rings 4, 4.

Second Preferred Embodiment

A Second Preferred Embodiment of the present hose connector will be hereinafter described with reference to FIGS. 7 through 12. FIGS. 7 through 12 illustrate the Second Preferred Embodiment in service. Note that the Second Preferred Embodiment is provided with a single hose connector member.

Figure 7:
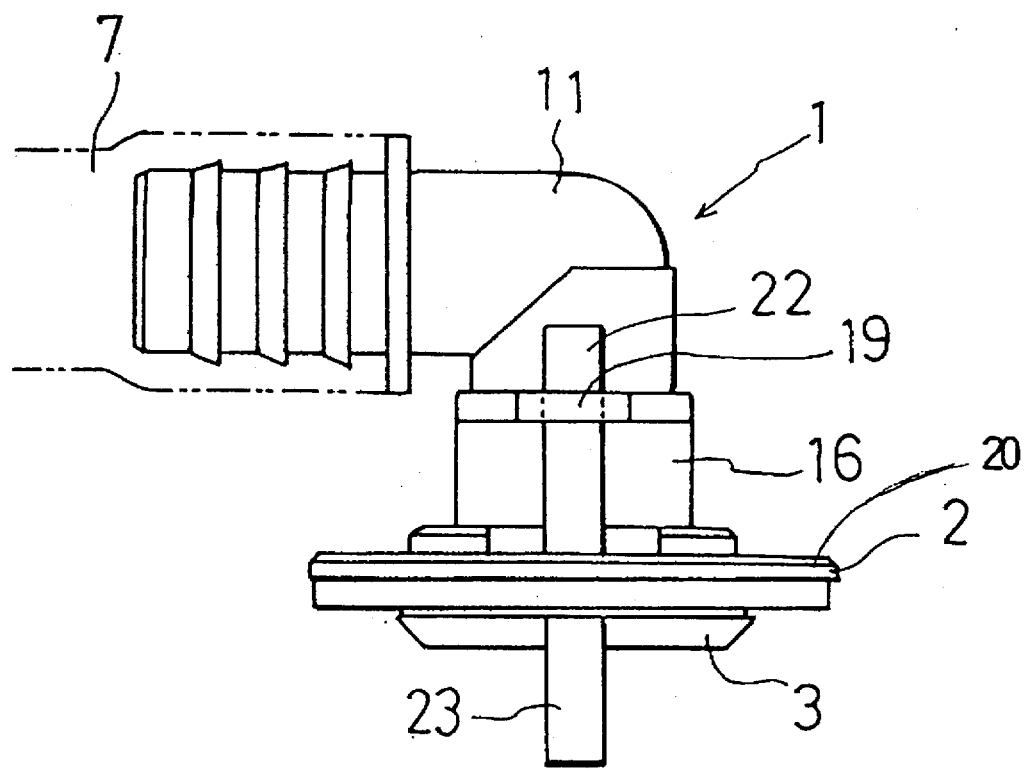
FIG. 7 is a plan view of a Second Preferred Embodiment of a hose connector according to the present invention before the installation to a pipe and a dashboard panel.
Figure 7:
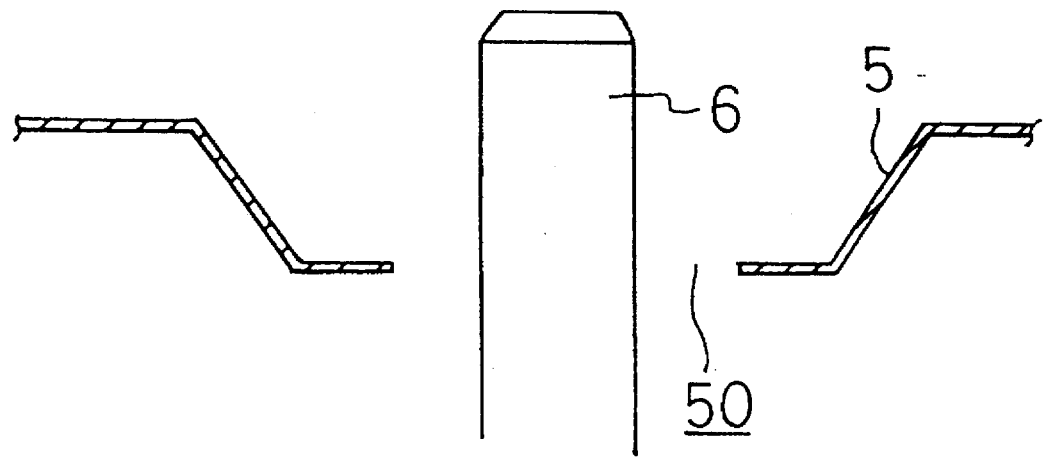
Figure 8:
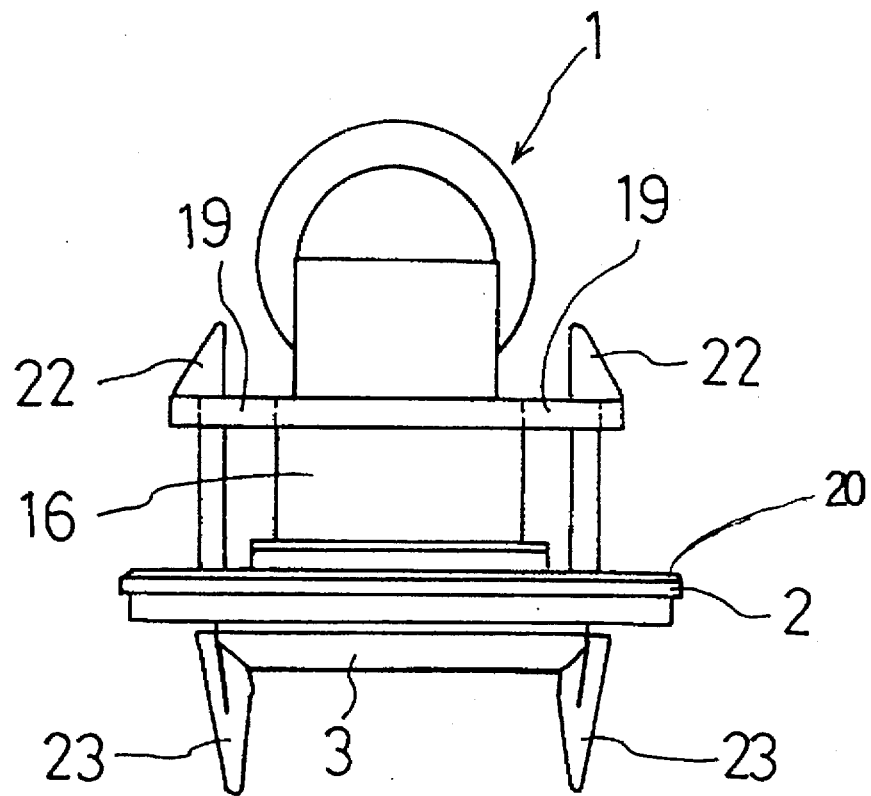
FIG. 8 is a side view of the Second Preferred Embodiment of the present hose connector before the installation to a pipe and a dashboard panel.
Figure 8:
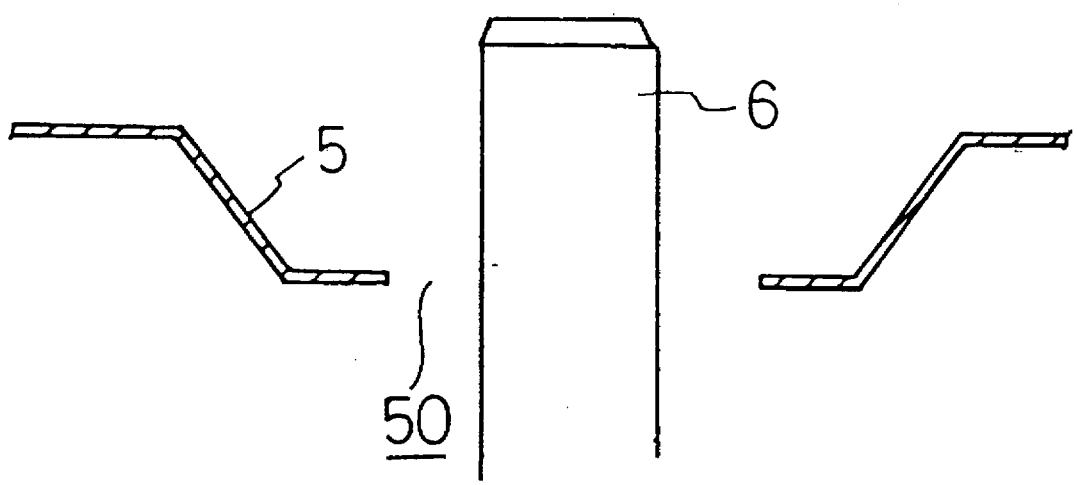
Figure 10:
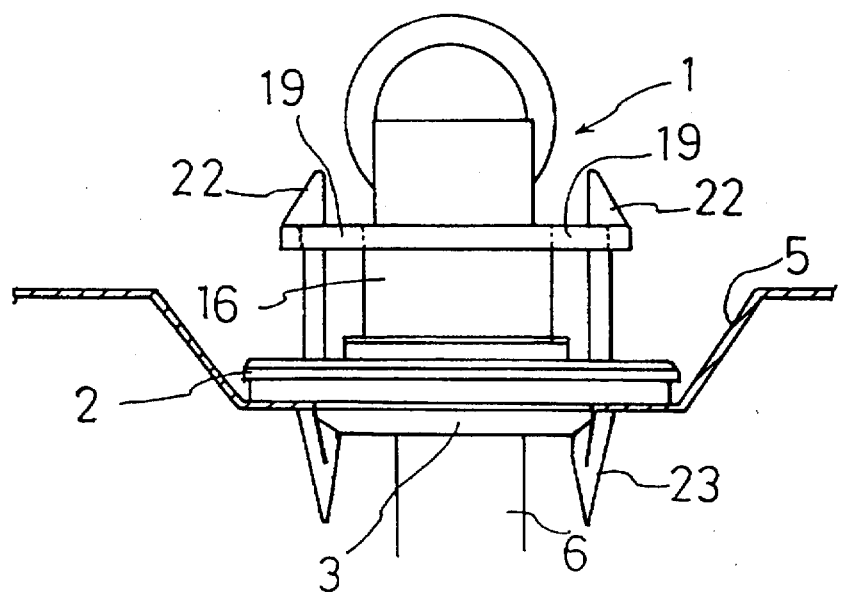
FIG. 10 is a side view of the Second Preferred Embodiment of the present hose connector after the installation to a pipe and a dashboard panel.
Figure 11:
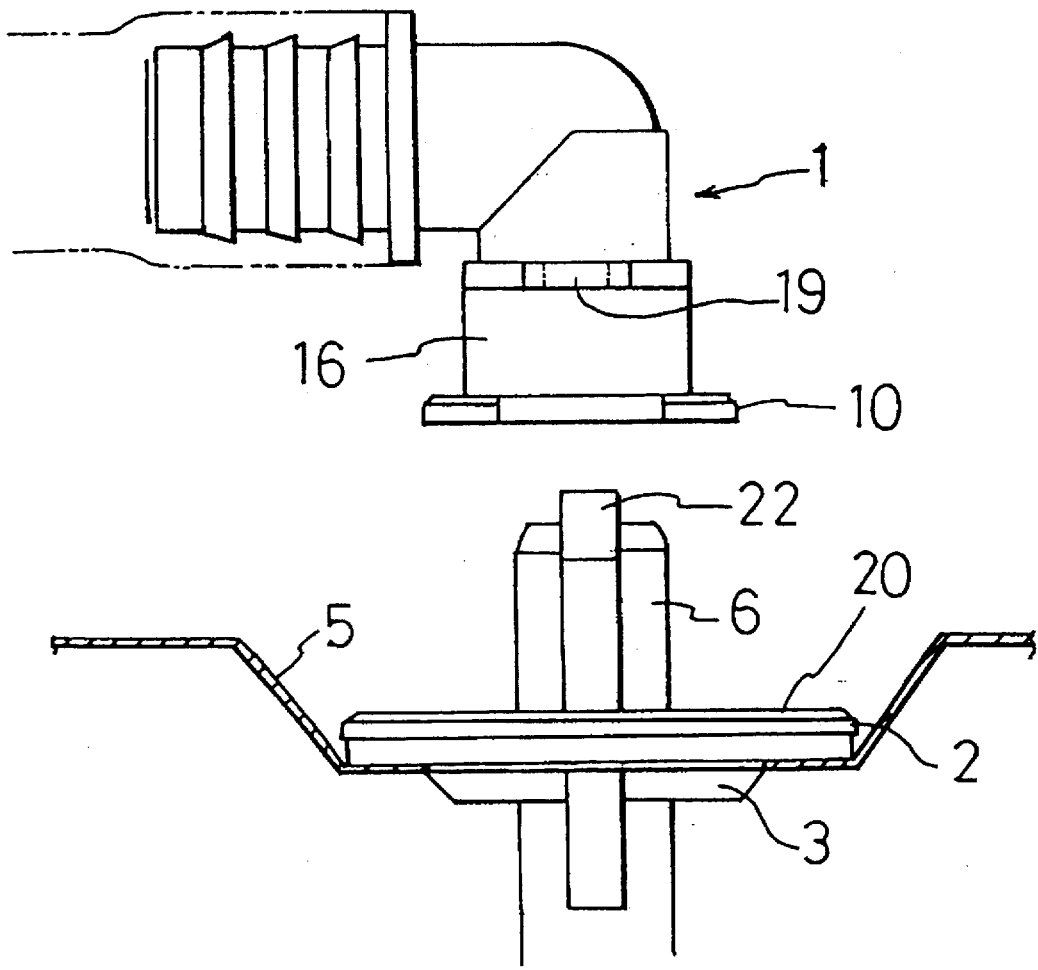
FIG. 11 is a plan view of the Second Preferred Embodiment of the present hose connector with a connector body disconnected after the installation to a pipe and a dashboard panel.
Figure 12:
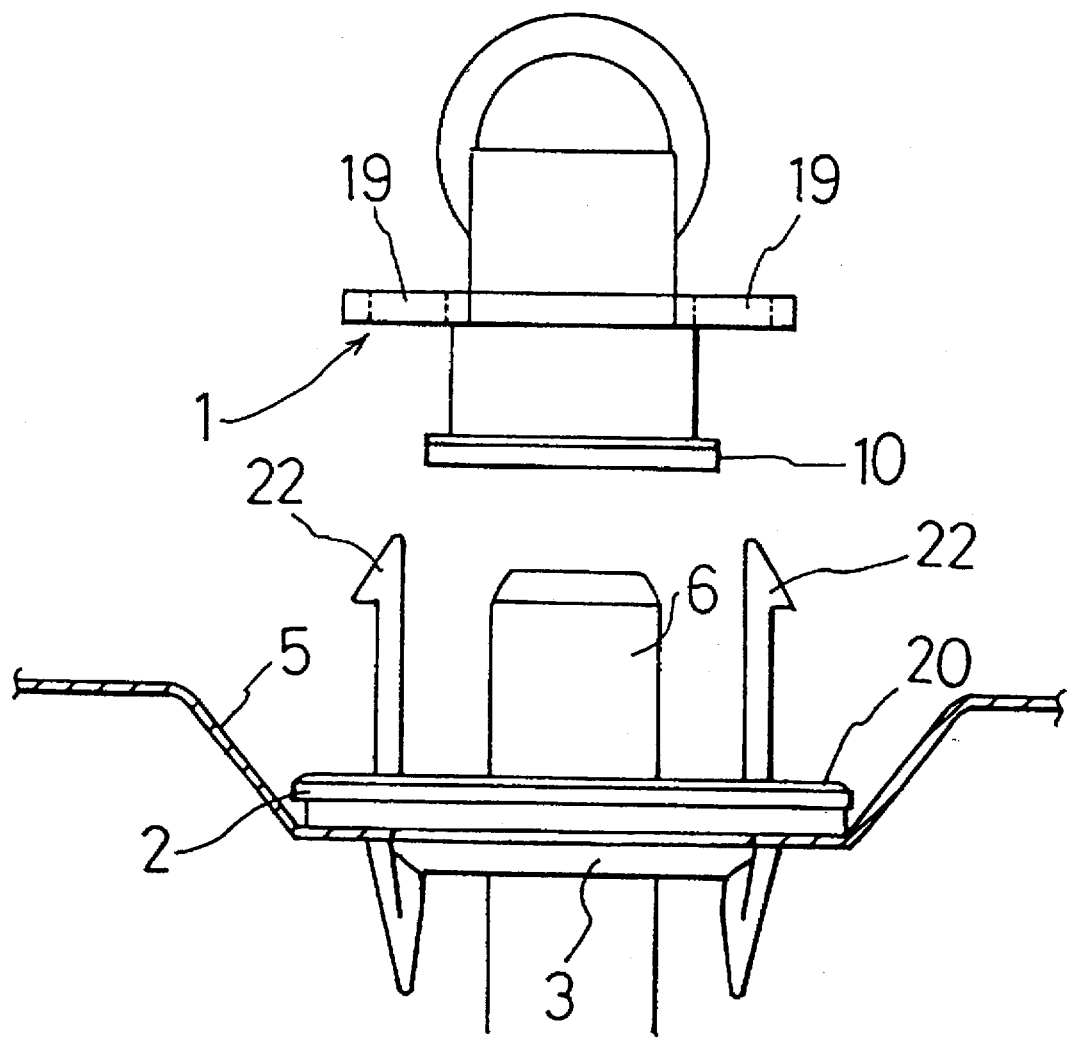
FIG. 12 is a side view of the Second Preferred Embodiment of the present hose connector with a connector body disconnected after the installation to a pipe and a dashboard panel.
Figure 13:
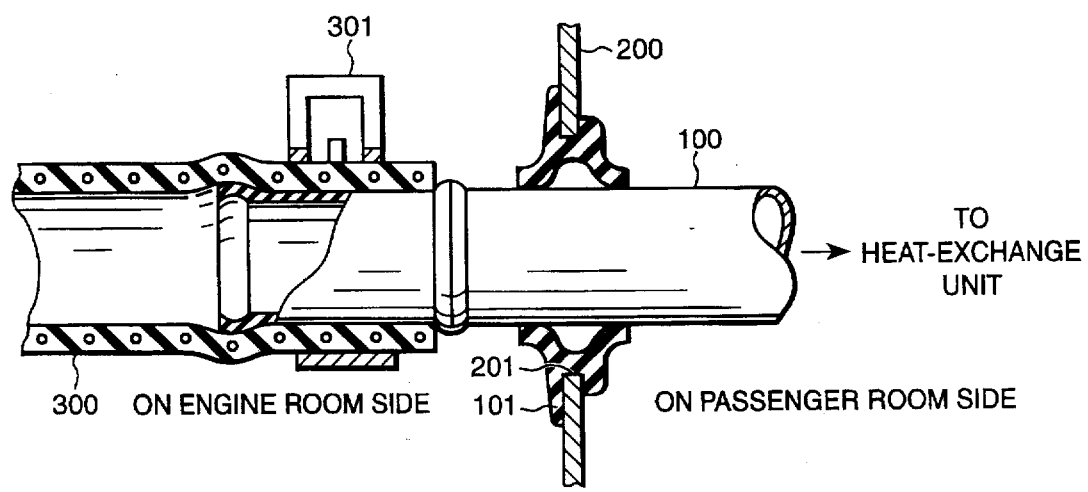
FIG. 13 is a cross-sectional view for illustrating how a hose and a pipe have been connected to each other conventionally.

The Second Preferred Embodiment of the present hose connector comprises a connector body 1, an intermediate member 2, and a grommet 3 similar to the First Preferred Embodiment. The connector body 1 is provided with a single hose connector member 11. As illustrated in FIG. 11, the hose connector member 11 is provided with a first flange member 10. As illustrated in FIG. 7, the connector body 1 is further provided with a single pipe connector member 16. As illustrated in FIG. 11, the pipe connector member 16 is formed adjacent the first flange member 10. The hose connector member 11 and the pipe connector member 16 have the same arrangements as those of the First Preferred Embodiment. The connector body 1 of the Second Preferred Embodiment differs from that of the First Preferred Embodiment in that it is provided with a pair of engager holes 19, 19. As illustrated in FIGS. 8, 10 and 12, the engager holes 19, 19 are disposed outside the pipe connector member 16, and are placed on opposite sides of the pipe connector member 16, symmetrically with each other, and with respect to the axis of the pipe connector member 16.

The intermediate member 2 of the Second Preferred Embodiment is provided with a pair of first engager claws 22, 22 which are placed symmetrically with respect to the axis of a second flange member 20 of the intermediate member 2 as illustrated in FIGS. 8, 10 and 12, and it has the same arrangement as that of the First Preferred Embodiment. The first engager claws 22, 22 engage the pair of engager holes 19, 19 of the connector body 1, respectively.

As illustrated in FIGS. 7 through 12, the grommet 3 of the Second Preferred Embodiment has an outer periphery which conforms to that of the second flange member 20 of the intermediate member 2, and it too has the same arrangement as that of the First Preferred Embodiment.

The thus constructed Second Preferred Embodiment of the present hose connector connects a pipe 6 with a heater hose 7 as hereinafter described. As illustrated in FIGS. 7 and 8, the hose 7 is first connected with the hose connector member 11 of the connector body 1. Then, the first engager claws 22, 22 of the intermediate member 2 are engaged with the engager holes 19, 19 of the connector body 1 to fasten the intermediate member 2 to the connector body 1.

Figure 9:
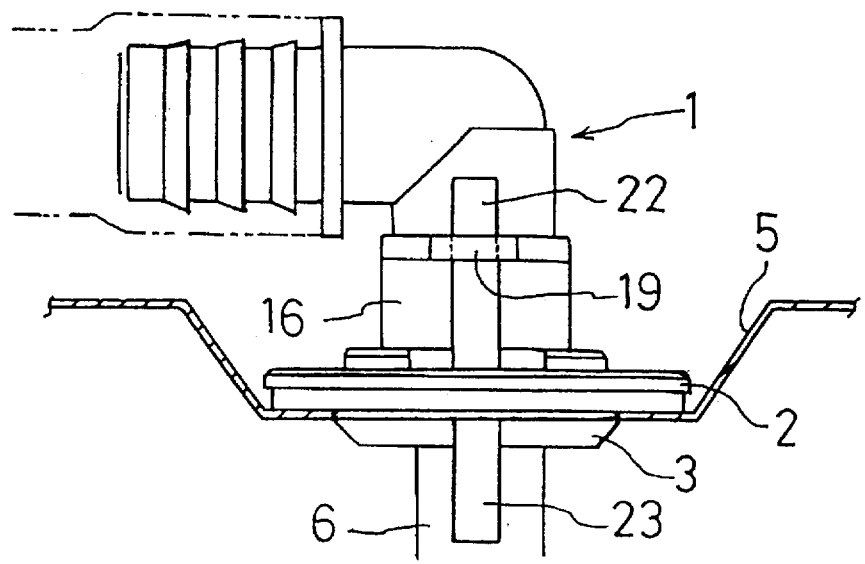
FIG. 9 is a plan view of the Second Preferred Embodiment of the present hose connector after the installation to a pipe and a dashboard panel.

Thereafter, as illustrated in FIGS. 9 and 10, the pipe 6 is inserted into the pipe connector member 16. At the same time, as illustrated in FIG. 10, the second engager claws 23, 23 of the intermediate member 2 are press-fitted into an installation hole 50 of a dashboard panel 5 to engage the second engager claws 23, 23 of the intermediate member 2 with the dashboard panel 5. Thus, the connector body 1, the intermediate member 2 and the grommet 3 are fastened to the dashboard panel 5. As a result, pipe 6 and hose 7 are connected with each other.

When carrying out maintenance, etc., the pair of first engager claws 22, 22 are pinched manually with fingers, or the like. The first engager claws 22, 22 move toward each other, and accordingly disengage from the engager holes 19, 19. When the first engager claws 22, 22 are disengaged from the engager claws 19, 19, the connector body 1 can be disconnected from the dashboard panel 5. At this moment, as illustrated in FIGS. 11 and 12, the intermediate member 2 and the grommet 3 stay on the dashboard panel 5 in the same manner as the First Preferred Embodiment. Thus, the intermediate member 2 and the grommet 3 remain fastened and sealed to the dashboard panel 5 highly closely.

Having now fully described the present invention, it will be apparent to one of ordinary skill in the art that many changes and modifications can be made thereto without departing from the spirit or scope of the present invention as set forth herein including the appended claims.

What is claimed is:

1. A hose connector, comprising:

a connector body including a hose connector member connected with a hose, a pipe connector member connected with a pipe and communicating with the hose connector member, the pipe extending through a mounting hole of a mounting member and fitted into the pipe connector member, and a first engager disposed adjacent to the pipe connector member;

an intermediate member detachably engaged with said connector body, and including a central hole, a flange extending around the central hole and having opposite sides, a second engager formed on one of the opposite sides of the flange and detachably engaged with the first engager, and an engager claw formed on another one of the opposite sides of the flange, fitted into the mounting hole to engage with the mounting member; and a grommet held on another one of the opposite sides of the flange of said intermediate member, and interposed between the mounting member and the flange to seal a periphery of the mounting hole.

2. The hose connector according to claim 1, wherein the hose connector member of said connector body extends from said connector body by a predetermined length parallel with the pipe connector member, and thereafter bends substantially perpendicularly to the pipe connector member.

3. The hose connector according to claim 1, wherein said connector body includes a pair of the pipe connector members, and the first engager is disposed between the pipe connector members.

4. The hose connector according to claim 1, wherein said connector body includes the pipe connector member in a quantity of one, and a pair of the first engagers disposed outside the pipe connector member so as to interpose the pipe connector member.

* * * * *